(12) United States Patent
Casarini et al.

(10) Patent No.: US 12,190,014 B2
(45) Date of Patent: Jan. 7, 2025

(54) METHOD AND APPARATUS FOR GENERATING TARGET SOUNDS

(71) Applicant: Apple Inc., Cupertino, CA (US)

(72) Inventors: Cecilia Casarini, Reggio Emilia (IT); Ian M. Fisch, Santa Cruz, CA (US); Jakub Mazur, Santa Clara, CA (US); Mitchell R. Lerner, San Francisco, CA (US); Pablo David Brazell Ruiz, Cupertino, CA (US); Stephen W. Ryner, Jr., Gurnee, IL (US); Tyrone T. Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/339,724

(22) Filed: Jun. 4, 2021

(65) Prior Publication Data

US 2022/0374193 A1 Nov. 24, 2022

Related U.S. Application Data

(60) Provisional application No. 63/190,680, filed on May 19, 2021.

(51) Int. Cl.
| | | |
|---|---|---|
| *G06F 3/16* | (2006.01) | |
| *H04R 5/033* | (2006.01) | |
| *H04R 5/04* | (2006.01) | |
| *H04S 1/00* | (2006.01) | |
| *H04S 7/00* | (2006.01) | |

(52) U.S. Cl.
CPC ............ *G06F 3/165* (2013.01); *H04R 5/033* (2013.01); *H04R 5/04* (2013.01); *H04S 1/007* (2013.01); *H04S 7/30* (2013.01)

(58) Field of Classification Search
None
See application file for complete search history.

(56) References Cited

U.S. PATENT DOCUMENTS

| | | | |
|---|---|---|---|
| 5,832,431 A * | 11/1998 | Severson | A63H 19/14 704/258 |
| 6,359,549 B1 * | 3/2002 | Lau | G10H 1/26 381/94.1 |
| 7,649,988 B2 | 1/2010 | Suppappola et al. | |
| 10,303,422 B1 * | 5/2019 | Woo | H04N 21/4307 |

(Continued)

FOREIGN PATENT DOCUMENTS

EP 2447828 5/2012

OTHER PUBLICATIONS

Keith, J., "Introduction to the Stereo Enhancement Techniques Used in Vorsis On-Air Audio Processors," Orsis Application Note AN5008-03A, Sep. 1, 2008, 13 pages.

(Continued)

*Primary Examiner* — Duc Nguyen
*Assistant Examiner* — Assad Mohammed
(74) *Attorney, Agent, or Firm* — Aikin & Gallant, LLP

(57) ABSTRACT

A method for headphone playback of target sound. Some of the bins of a sound file are accessed, wherein the sound file has several bins each bin storing a number of audio sections. Audio sections are selected from the accessed bins, and mixed while cross fading to form a target sound sequence. A headphone speaker is driven with the target sound sequence. Other aspects are also described and claimed.

20 Claims, 6 Drawing Sheets

(56) References Cited

U.S. PATENT DOCUMENTS

| | | | |
|---|---|---|---|
| 2004/0136554 A1* | 7/2004 | Kirkeby | H04S 1/005 |
| | | | 381/11 |
| 2009/0074208 A1 | 3/2009 | Roh | |
| 2014/0350706 A1 | 11/2014 | Morishima | |
| 2015/0195641 A1 | 7/2015 | Di Censo et al. | |
| 2017/0171577 A1* | 6/2017 | Kipp | G11B 27/10 |
| 2017/0309282 A1 | 10/2017 | Mani et al. | |
| 2018/0117277 A1 | 5/2018 | Yamaki et al. | |
| 2019/0230438 A1* | 7/2019 | Hatab | G10L 25/18 |
| 2019/0244639 A1* | 8/2019 | Benedetto | G11B 27/11 |
| 2019/0246234 A1 | 8/2019 | Sherburne et al. | |
| 2019/0282780 A1 | 9/2019 | Kwak | |
| 2020/0254325 A1* | 8/2020 | Fritz | A63B 24/0062 |
| 2020/0314524 A1* | 10/2020 | Querze, III | H04S 7/304 |
| 2021/0178268 A1* | 6/2021 | Rogers | G11B 27/038 |
| 2021/0304736 A1* | 9/2021 | Kothari | G10L 15/26 |

OTHER PUBLICATIONS

"ATA's Masking Sound Library," American Tinnitus Association, retrieved from the Internet <https://www.ata.org/ata_s-masking-sound-library>, Apr. 21, 2021, 2 pages.

Non-Final Office Action for U.S. Appl. No. 17/339,725 mailed Oct. 5, 2022, 17 pages.

Combined Search and Examination Report under Sections 17 and 18(3) for United Kingdom Application No. GB2113720.3 mailed Jun. 27, 2022, 9 pages.

* cited by examiner

METHOD AND APPARATUS FOR GENERATING TARGET SOUNDS

This nonprovisional US patent application claims the benefit of the earlier filing date of U.S. provisional application No. 63/190,680 filed May 19, 2021.

FIELD

As aspect of disclosure here relates to digital audio processing techniques for improving the experience of headphone wearers. Other aspects are also described.

BACKGROUND

Headphones are used not just for listening to music and participating in phone calls, but also for creating a quiet hearing experience for the wearer using acoustic noise cancellation for example while riding in an airplane, a train, or a bus. With designs that are increasingly comfortable, and attractive yet unobtrusive, some headphones can also be worn for longer time periods. Wearers are often seen with headphones on not just while engaged in other mental or physical activities but also while simply relaxing.

SUMMARY

One aspect of the disclosure here is a process for generating a target sound by a speaker that may be integrated within a headphone, that helps avoid distractions from internal and external sound sources that a listener (e.g., the wearer of the headphone) might be hearing at any given moment. The target sound may mask or lessen the perceived loudness of other sounds that the listener could be hearing and that are distracting. The other sounds could be external such as passive leakage of environment sound (e.g., babble, chatter, machine noise) or it could be internal (something other than leakage of the environment sound that the listener hears, which may include occlusion effect, active real-time reproduction of environment sound, acoustic noise cancellation artifacts, media playback, and phone calls.) A result is that the listener is able to focus on a particular activity they are engaged in, like reading or writing/typing, the listener is relaxed simply because the other sound which may not be desirable is being masked by the target sound, the target sound helps the listener fall asleep, or the target sound fills time intervals of no speech during podcasts or phone calls (e.g., like background.) These may enhance the listener's headphone listening experience especially over a longer time interval of several hours or for the most part of an entire day.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated byway of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Figure 1:
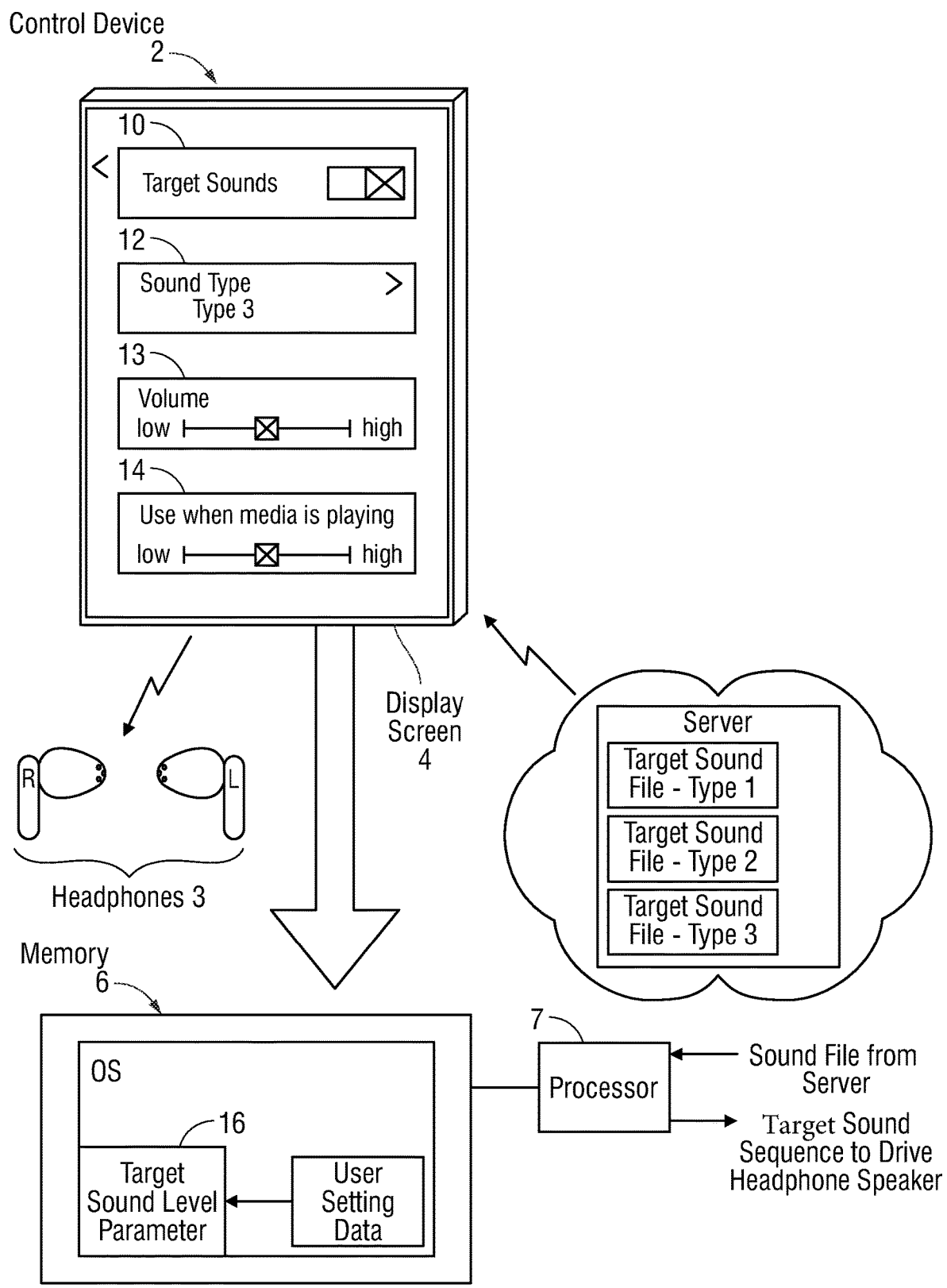
FIG. 1 shows an example apparatus for generating target sounds.

Everyday sounds can be distracting, discomforting, or overwhelming. An aspect of the disclosure here is a process performed by an electronic control device for generating target sound by a speaker (e.g., a headphone speaker that is integrated into a housing of a headphone.) Target sounds may help reduce distractions and help a listener to focus, stay calm, or rest. Referring to FIG. 1, the process may be performed by an electronic control device 2 which may be for example a smartphone, a smartwatch, a laptop computer, a tablet computer or a desktop computer. The control device 2 may be a companion device (e.g., an audio source user computing device) that is paired with one or more headphones (left and right headphones 3) over a wireless communication link, e.g., a Bluetooth link, or it may be communicatively coupled to the headphones 3 over a wired or non-wireless link (e.g., a USB cable link.) In both instances, the control device 2 drives a target sound sequence as an audio signal to the inputs of the speakers in the headphones 3. To drive a headphone speaker, a processor 7 or other hardware in the control device 2 conditions and prepares (formats for transmission or delivery to a headphone speaker) an audio signal containing the target sound sequence. The audio signal that is driving the speaker may also contain other audio content depending on the mode of operation of the control device 2, such as anti-noise from an acoustic noise cancellation subsystem (ANC), media playback (e.g., from a music, movie, or podcast app), phone call, or system sounds in a notification audio signal (such as an incoming message alert, a calendar reminder, or a ringtone.)

The audio signal is delivered to audio circuitry in the headphones 3. There can be different types of audio circuitry in the headphones 3 depending on the capabilities of the headphones 3, ranging from passive, analog wired headphone speakers to a full-featured, wireless headphone that has a built-in wireless transceiver, ANC, an external microphone used for active reproduction of ambient environment sound, digital to analog conversion, and an audio amplifier whose load is the headphone speaker. Playback occurs when the audio circuitry feeds the audio signal to the input of a headphone speaker to produce the target sound and optionally other sound that is contained in the audio signal. While the figure shows the headphones 3 as being earbuds, they could instead be of another type such as over the ear headphones or on the ear headphones.

In FIG. 1, a display screen 4 of the control device 2 has been configured by the processor 7 pursuant to instructions stored in memory 6, e.g., as part of an operating system (OS) of the control device 2, to display one or more target sound user settings. The memory 6 is an example of a non-transitory computer readable medium having instructions that configure a processor to perform most if not all of the method operations described in this disclosure. In the example shown, the processor configures the display screen 4 with a graphical user interface (GUI) screen that presents several target sound user settings. The display screen 4 may be a touchscreen, in which the processor 7 presents the GUI screen responding to a single finger swipe on the touchscreen, for example during lock screen state or during home screen state of the control device 2. In such a "quick view", the touchscreen is configured to directly display a number commonly used controls which includes the target sound user setting and one or more typical settings such as a wireless local area network switch, screen brightness, volume, calculator, portrait orientation lock switch, flashlight, and camera.

Figure 2:
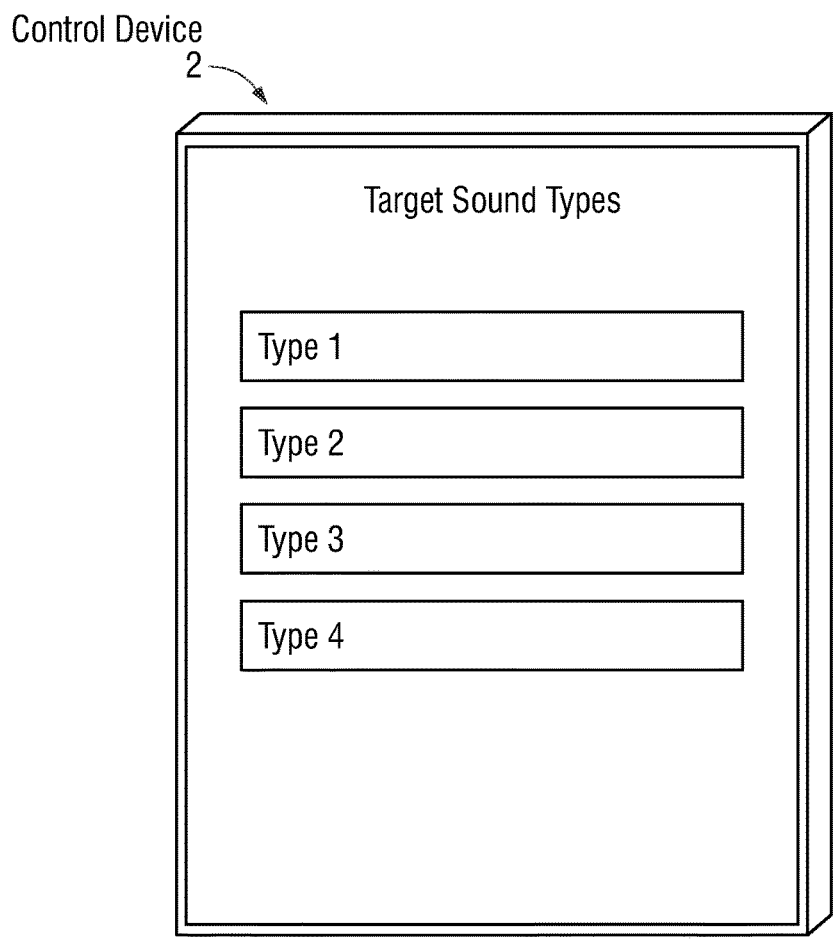
FIG. 2 shows an example graphical user interface that presents a target sound user setting.

The user settings permit a user (e.g., the listener, who may be wearing the headphones 3 and who also owns or administers the control device 2) to manually control the target sound playback feature. There is a target sound enable setting 10 which may be a toggle switch as shown that enables and disables this feature. There may also be a sound type setting 12 which be a selector switch that sets the type of sound for playback (from a number of available types of sound files—see FIG. 2 (e.g., waves or ocean, rainfall, stream, forest, birds, and a synthesized sound being a type of noise such as pink noise or white noise.) There is also a target sound user setting such as a first selector 13 and optionally a second selector 14 that sets a target sound level parameter 16, which is stored within the memory 6. The processor 7 generates the target sound sequence in accordance with one or more of these user settings (and the stored target sound level parameter 16 that corresponds to the user setting), and a speaker of the headphones 3 is then driven with the generated target sound sequence.

The first selector 13 is a variable level setting that lets the user set a first one of the stored target sound level parameters 16 to between a low setting and high setting as shown, for example while the user is listening to the target sound playback through the headphones 3 they are wearing. In addition, or as an alternative to the first selector 13, the second selector 14 is a variable level setting that sets a second one of the stored target sound level parameters 16 (to between low and high settings); the second selector 14 may be provided to set a different target sound level during media playback (than during no media playback.) In other words, if target sound is enabled, then its level is set during media playback according to the second one of the parameters 16 and during no media playback it is set according to the first one of the parameters 16. The second selector 14 may indicate its level i) as being relative to a media playback level or ii) for use during media playback. In another aspect of the disclosure here, the target sound user setting includes a schedule setting to play the target sound sequence at certain times of the day or on certain days of the week.

Target Sound Design

Figure 3:
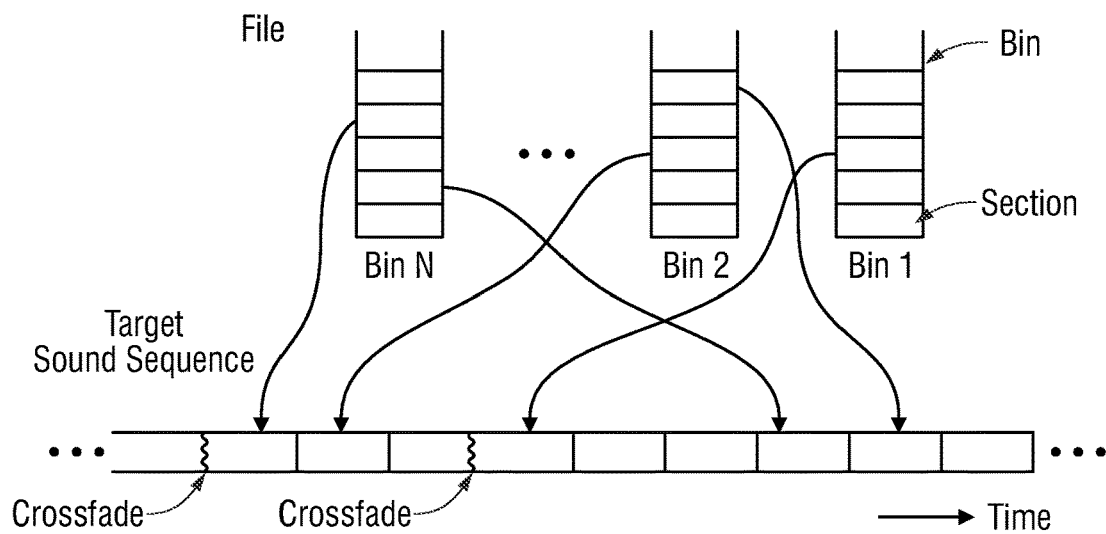
FIG. 3 illustrates a target sound sequence being formed from sections of a sound file.

Referring now to FIG. 3, this figure illustrates how the target sound sequence may be formed, using a sound file that is stored in the form of N (being two or more) bins and several sections in each bin. As pointed out above, the sections that make up a sound file may be sounds of recorded nature (e.g., rain, a stream, waves, birds), or they may be synthetic (generated) sounds such as various type of noise. In one aspect, the bins that make up a file are downloaded from the cloud and stored in "local" memory, within memory inside a headphone housing or within the control device 2 (see FIG. 1.) The file may be updateable from a remote serve (e.g., the cloud), in order for example use a more desirable or a different version of the recorded or generated sound. In one aspect, all of the sections in each bin may have the same length, or there may be some that have different lengths (in terms of for examples duration in milliseconds, ms.)

The processor 7 may execute an algorithm that organizes or defines a sequence of bins from which it selects sections, which sections are then joined as shown to form the target sound sequence. The algorithm, including a predefined bin sequence may be pre-authored in the laboratory and then downloaded into the control device for execution. The sections are mixed or linked while cross fading as needed to form a smooth, continuous playback sequence. Once the bin sequence has been organized, the processor 7 selectively pulls or downloads the bins (that are called out in the bin sequence) from the server over time, to generate the target sound sequence. This helps accommodate situations where computing resources are constrained, e.g., where the control device 2 or the memory inside the headphone housing is constrained. In other words, a small preview of the target sound sequence is stored on the control device or the headphone, but a larger story stays in the server until it is time for that portion of the target sound sequence to be generated for playback.

Figure 4:
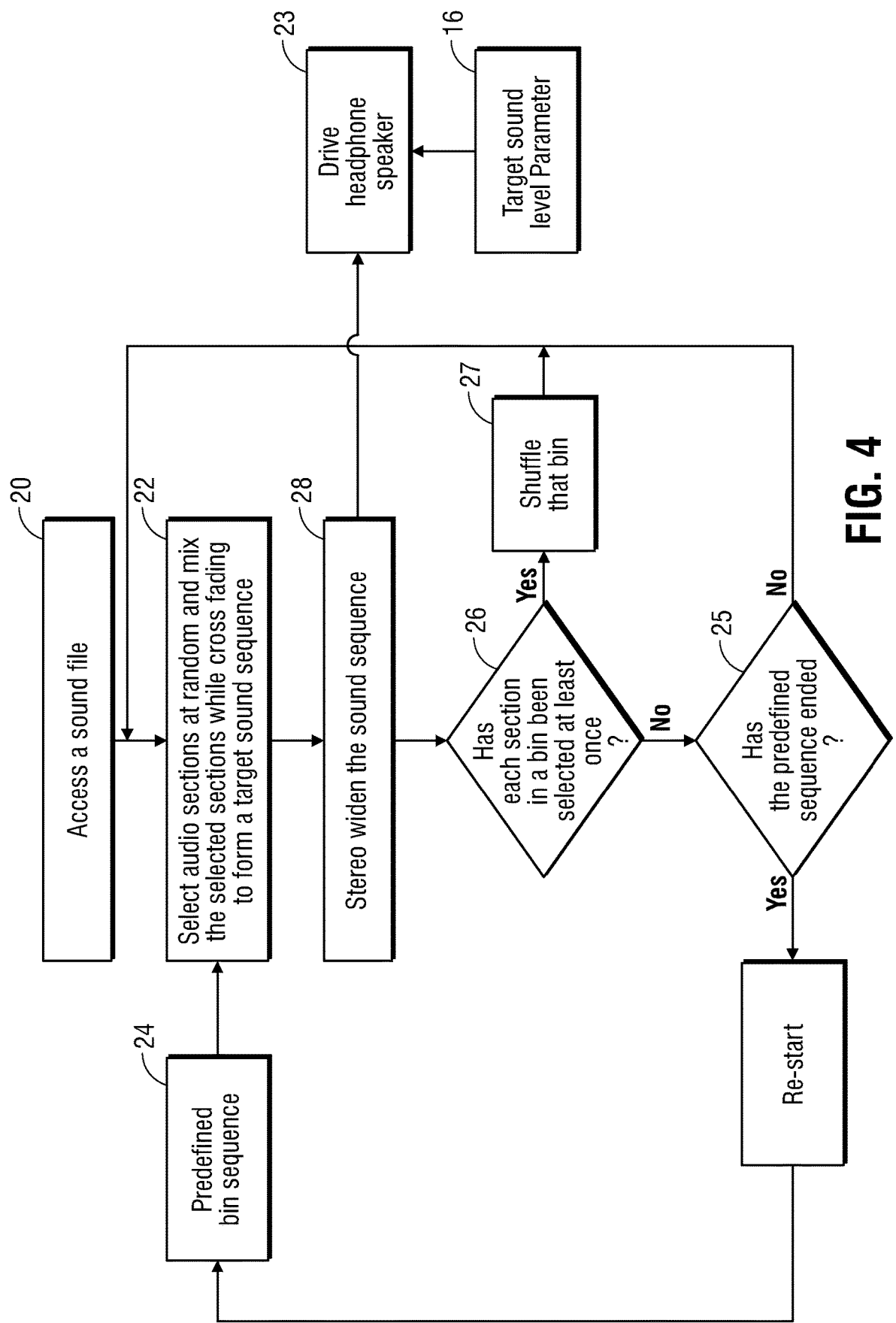
FIG. 4 is a flow diagram of an example method for generating the target sound sequence.

FIG. 4 shows a flow diagram of an example method for generating the target sound sequence. The process may begin with accessing (20) at least part of a sound file, e.g., by learning the location in memory 6 where some, not necessarily all, of the constituent bins of a given sound file are stored. Note that this may be preceded by downloading those bins from the cloud into the memory 6. Audio sections are then selected from the accessed bins and mixed while cross fading (22), to form the target sound sequence (see FIG. 3.) In the case where, in operations 20 and 22, the accessed sound file is recorded nature sounds, the audio sections are selected randomly from each bin. In the case where the accessed sound file is synthetically generated sounds (e.g., noise), the selected audio sections in operation 22 may be longer (time intervals) such as fifteen seconds each and may follow a deterministic sequence, e.g., a repeating loop. A level of the target sound sequence may then be adjusted to match the stored, target sound level parameter (16), and then the headphone speaker is driven with the target sound sequence (23).

In one aspect, the recorded nature sounds in the bins are rainfall sounds, and for any given bin all of the sections in that bin sound different but have similar rainfall intensity. In other words, multiple rainfall bins are selected where each has a different intensity of rainfall. This lets the algorithm create a rainfall story by selecting sections from a low intensity bin (light rainfall) and then overtime selecting sections from higher intensity bins (heavy downpour.) For instance, the target sound sequence begins a progression from low intensity rainfall which then intensifies over time to high intensity rainfall, and wherein each time the target sound sequence starts playback, this progression from low intensity rainfall to high intensity rainfall has a different speed. In this aspect, the algorithm is "dynamic" in that it creates a story, where rain starts as drops and then intensifies overtime, with variations in this story each time the target sound feature starts to play. For instance, when the target sound feature is enabled for the first time, the algorithm links the selected bins to form intensifying rain over for example 15 minutes. The second time the target sound feature is enabled (or re-started following a pause as described further below), the progression from slow to heavy rainfall takes foe example 5 minutes.

Still referring to FIG. 4, in one aspect that is illustrated, the selection of audio sections from the bins is in accordance with a pre-authored or predefined bin sequence (24) from which the audio selections are made. Once the predefined bin sequence has ended or has been completed (25), the predefined bin sequence (24) may be re-started so that formation of the target sound sequence can continue uninterrupted, in operation 22. When each section in a bin has been randomly selected at least once (26), the sections of that bin are shuffled (27) before that bin is re-used in operation 22. In other words, the predefined bin sequence 24 may repeat but the selections from each bin in operation 22 are randomized, and each bin is shuffled every so often.

Thus, as a whole, the resulting playback (of the target sound sequence) does not become memorable to the listener even over a period of weeks, months or years. For instance, the listener will not hear the same bird in the same place, or will not hear the same wave over and over again. This is in contrast to the random but still repetitive nature of a washing machine sound.

In another aspect, which also happens to be depicted in the same flow diagram of FIG. 4, the method also includes stereo widening (28) of the target sound sequence before driving the left and right headphone speakers (23). Doing so helps ensure that the target sound is perceived by the listener as being wide or having an enhanced stereo effect, so that the listener is less likely to focus on it. This may be done by scrambling or de-correlating left and right versions of the target sound sequence.

Control Device Operating System (OS) Infrastructure for Managing Target Sound Playback As introduced earlier, the control device 2 may have an OS infrastructure for managing target sound playback, through a GUI that presents user settings for controlling the target sound. These settings may include the enable setting 10 (see FIG. 1) that lets the listener manually enable and disable playback of the target sound sequence. The OS infrastructure may configure the processor 7 to perform the method depicted in FIG. 5 in which the enable setting 10 is accessed (31) to determine whether or not target sound playback is enabled (33.) If target sound playback is not enabled, then the processor automatically prompts a user of the control device 2 when media playback starts (35), to set the target sound level. If, however, target sound playback is enabled, then the processor automatically fades-in the target sound sequence, at a level that is in accordance with the target sound user setting (36), in response to i) detecting that the user is wearing headphones (37) or ii) detecting that media playback has started (39).

Figure 5:
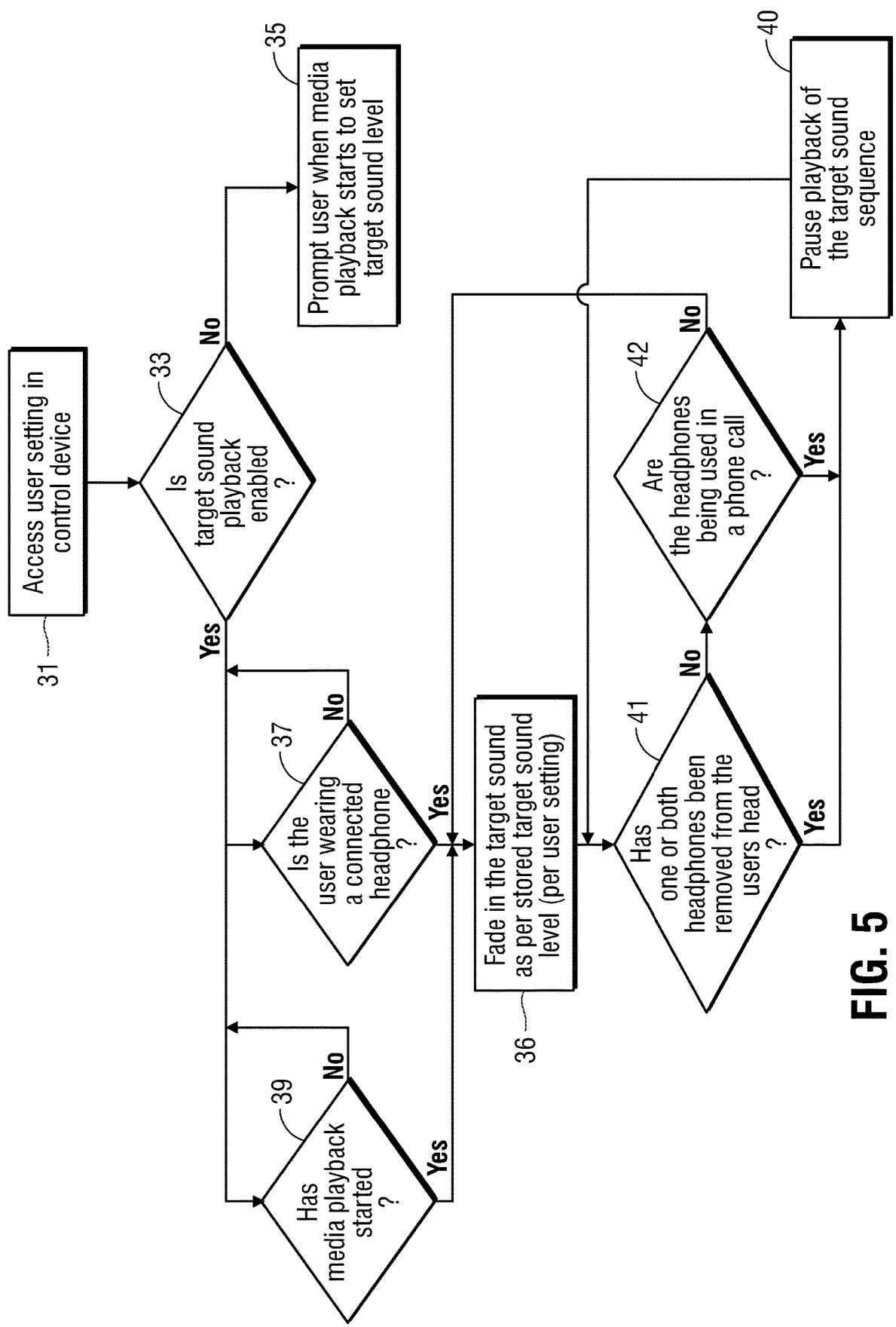
FIG. 5 is a flow diagram of an example method for managing the playback of the target sound sequence.

The flow diagram in FIG. 5 is also used to illustrate certain situations when the target sound playback is paused (40). To reduce power consumption, the algorithm that is generating the target sound sequence (e.g., part of the method in FIG. 4) may also be paused in that case. In one aspect, the playback is paused in response to detecting that the listener has removed one or both headphones 3 from their head (41). In another aspect, the playback is paused in response to detecting that the headphones 3 are being used in a phone call (42), e.g., an audio or video call. In both instances, playback of the target sound sequence may resume (by looping back to operation 36 as shown, which may also include re-starting the method in FIG. 4) once the headphones are back against the listener's head or the phone call has ended.

Dynamic Mixing of Target Sound with Other Audio Content

In one aspect, the target sound plays continuously while the headphones 3 are being worn, and can mask unwanted environmental or external noise that has leaked into the user's ear (despite the passive isolation provided by wearing the headphones 3.) In addition, the processor 7 can be configured to mix and duck the target sound sequence "under" other simultaneous sound that is being reproduced by the headphone, and that would be heard by the listener. Ducking under refers to for example reducing the wideband gain of the target sound sequence so that it is not prominent from the listener's standpoint relative to other, simultaneously playing audio content. The other audio content may be media playback, system sounds (e.g., a message or calendar notification), or active reproduction of ambient environment sound by the headphone. In particular, the processor 7 could make gain adjustments on the target sound as a function of simultaneously occurring active reproduction of environment sound or acoustic noise cancellation. For example, the target sound could be tailored (spectrally shaped) and added to mask any remaining or residual audible effects of an acoustic noise cancellation process.

Figure 6:
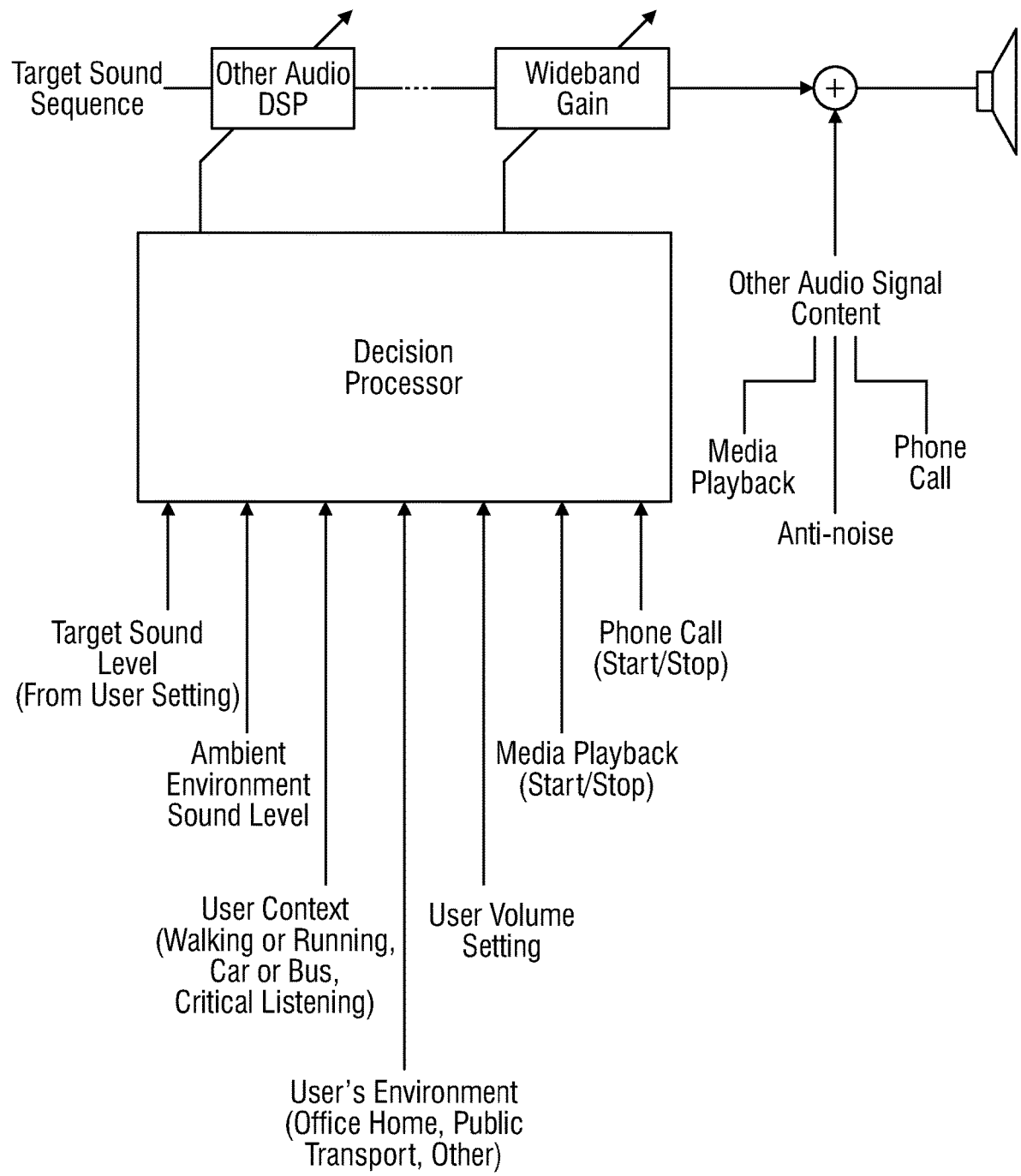
FIG. 6 depicts a decision processor that makes adjustments to including muting of the target sound sequence as a function of various variables.

FIG. 6 is a block diagram of how the target sound sequence can be tailored before being combined with other audio signal content, to drive the headphone speaker. This feature is also referred to here as dynamic target audio. A decision processor (e.g., the processor 7 executing or configured by instructions stored in the memory 6) can adjust a wideband gain of the target sound sequence based on one or more of the following inputs it could receive: detected ambient environment sound level; detected user context as being one of critical listening, running or jogging, or transportation as in a car or bus; detected environment of the listener as in office, home, or public transport; the current user volume setting (a manual setting for overall sound volume that is directly based on for example the physical volume control buttons on a smartphone); detecting that media playback has started or stopped (e.g., the media playback may be from a game app, a music app, a movie app, a podcast app, or a web browser); and detecting that a phone call has started or ended. For instance, the wideband gain of the target sound sequence is decreased in response to media playback starting and increased back up to the previous value (which is based on the stored target sound level parameter) when the media playback stops. In another instance, the gain of the target sound sequence is decreased or the target sound sequence is muted in response to the call starting, and increased or un-muted when the call ends. In yet another instance, the gain of the target sound is adjusted based on a personalized hearing/audio profile that may, for example, be obtained through a personalized enrollment process in which the user participates via the user's control device 2 and headphones (by responding to questions about sound stimuli that are played back through the headphones the user is wearing.) More generally, the target sound sequence may be viewed as replacing the listener's audible noise floor, but without interfering with the listener's hearing of media playback (e.g., preserve speech intelligibility during media playback or during a phone call.)

In another aspect, the decision processor adjusts the gain of the target sound sequence in such a way that reduces variation in short term loudness measurements of output by the headphone speaker despite changes in the other audio content. Short term loudness measurements are measurements of the headphone speaker output made over the past three seconds. In other words, the decision processor keeps the overall loudness of the speaker output consistent or relatively constant despite changes in the target sound sequence and changes in the other user audio content (that is simultaneously being played back.)

Figure 7:
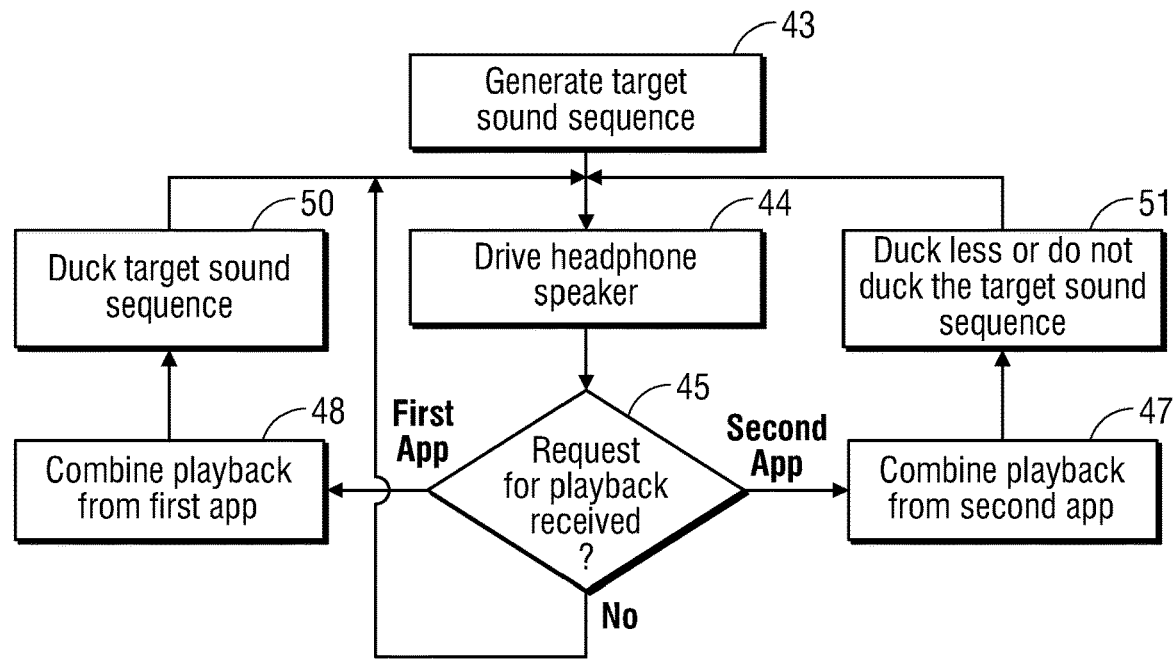
FIG. 7 is a flow diagram of an example method for making adjustments to the target sound sequence during its playback.

In another aspect, the processor 7 is configured to automatically duck the target playback in response to certain types of apps being launched or running, such as games, music, and movie apps, but continues the target playback without ducking (or ducks less) when the user audio content that is being routed to the headphone speaker is from a podcast app or a web browser. Such a method for playback of target sound may proceed as follows, referring now to the flow diagram of FIG. 7. The target sound sequence is generated in accordance with a user setting (43), and a headphone speaker is driven with the target sound sequence (44). When a request for playback is detected from a first app type or from a second app type (45), the processor 7 continues to drive the headphone speaker with the target sound sequence while combining the target sound sequence with playback from the first app type (48) or from the second app type (47). When combining with playback from the first app, the processor automatically ducks the target sound sequence (50), but when combining with playback from the second app, the processor will either i) not duck the target gain sequence, or ii) duck the target gain sequence less than when ducking during playback from the first app type (51).

In another aspect, when target sound is being played and no other user audio from an app is being routed to the headphone speaker, the processor may automatically reduce the gain of the target sound sequence when a podcast app starts to play but then raises the gain (back to a level that is in accordance with the stored target sound level parameter 16) when the podcasts app stops playing.

Figure 8:
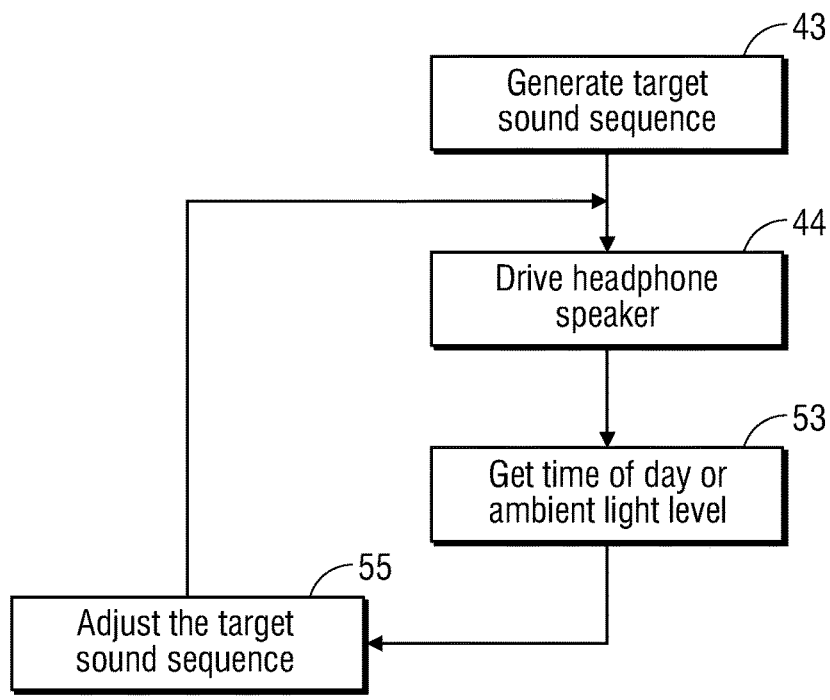
FIG. 8 is a flow diagram of another example method for making adjustments to the target sound sequence during its playback.

Referring now to FIG. 8, this is a flow diagram of another method for dynamic headphone playback of target sound, in which the target sound sequence is being generated as above in accordance with a user setting (43) and is driving the headphone speaker (44). While doing so, the processor makes automatic adjustments to the target sound sequence (55) as a function of the time day or as a function of ambient environment light levels (53). Such adjustments are not limited to wideband gain adjustments, but instead or in addition may include spectral shaping or other digital audio DSP adjustments—see, e.g., FIG. 6. For instance, the target sound sequence may be adjusted to produce brighter sound in the morning or during daylight, than in the evening or at nighttime.

The following statements may also be made concerning the various aspects disclosed above.

Operating System Infrastructure for Controlling Target Sound Playback

1. A method for controlling target sound playback, the method comprising: configuring a display screen of a control device to display a target sound user setting for controlling target sound playback, wherein the target sound user setting controls a stored target sound level parameter that is stored within memory of the control device; generating a target sound sequence in accordance with the user setting; and driving a speaker with the target sound sequence.

1a. The method of statement 1 wherein the target sound playback of the target sound sequence enables a listener to avoid distractions from internal sound sources or external sound sources that the listener hears simultaneously with the target sound playback.

1b. The method of statement 1 wherein the target sound playback of the target sound sequence masks or lessens perceived loudness of other sounds that a listener is hearing.

1c. The method of statement 1 wherein the target sound playback of the target sound sequence enables a listener to focus on a particular activity in which the listener is engaged.

2. The method of statement 1 wherein the target sound user setting comprises a variable level setting, separate from a user volume setting of the control device, that sets the stored target sound level parameter.

3. The method of statement 2 wherein the variable level setting indicates a level i) as being relative to a media playback level or ii) for use during media playback.

4. The method of statement 2 further comprising configuring the display screen to display a further target sound user setting having a further variable level setting that sets a further stored target sound level parameter that is used only during media playback or during a phone call.

5. The method of anyone of statements 1-4 wherein the target sound user setting comprises a schedule setting to play the target sound sequence at certain times of the day or on certain days of the week.

6. The method of anyone of statements 1-5 wherein the target sound user setting comprises a sound type setting.

7. The method of statement 6 wherein the sound type setting indicates at least one of: waves or ocean, rainfall, stream, forest, birds, and a synthesized sound being a type of noise such as pink noise or white noise.

8. The method of anyone of statements 1-7 wherein the display screen is a touchscreen, and configuring the display screen to display the user setting comprises responding to a single finger swipe on the touchscreen during lock screen state or during home screen state, by directly displaying a plurality of commonly used controls which includes the target sound user setting and one or more of: a wireless local area network switch, screen brightness, volume, calculator, portrait orientation lock switch, flashlight, and camera.

9. The method of any one of statements 1-8 further comprising if target sound playback is not enabled, then automatically present a prompt via the control device or via a headphone when media playback starts, to set a target sound level.

10. The method of anyone of statements 1-9 further comprising if target sound playback is enabled, then automatically fade-in the target sound sequence at a level that is in accordance with the target sound user setting and in response to detecting that i) the user is wearing one or more headphones or ii) media playback has started.

11. The method of anyone of statements 1-10 further comprising continuously driving the speaker with the target sound sequence until i) detecting that a headphone having the speaker has been removed from a user's ears or ii) detecting that the headphone having the speaker is being used in a phone call, and in response reducing gain of the target sound sequence or pausing playback of the target sound sequence.

11a. The method of any one of statements 1-10 wherein the target sound sequence continuously drives the speaker without any gain reduction while a system notification audio signal such as a message alert, a calendar reminder, or a ringtone is also simultaneously driving the speaker.

11b. The method of statement 11a wherein the target sound sequence is gain reduced but not muted, while the system notification audio signal is also driving the speaker.

12. The method of statement 11 wherein the gain of the target sound sequence that is driving the speaker is reduced during the phone call and is then raised in accordance with the target sound user setting when the phone call has ended.

13. A non-transitory computer readable medium comprising instructions that configure a processor to: configure a display screen of a control device to display a target sound user setting for controlling target sound playback, wherein the target sound user setting controls a stored target sound level parameter that is stored within memory of the control device; and generate a target sound sequence in accordance with the user setting, wherein the target sound sequence is to drive a speaker.

14. The computer readable medium of statement 13 wherein the target sound user setting comprises a variable level setting that sets the stored target sound level parameter.

15. The computer readable medium of statement 14 wherein the variable level setting indicates a level i) as being relative to a media playback level or ii) for use during media playback.

16. The computer readable medium of statement 14 wherein the processor is further configured to configure the display screen to display a further target sound user setting having a further variable level setting that sets a further stored target sound level parameter that is used only during media playback or during a phone call.

17. The computer readable medium of statement 13 wherein the target sound user setting comprises a schedule setting to specify playback of the target sound sequence at certain times of the day or on certain days of the week.

18. The computer readable medium of anyone of statements 13-17 wherein the display screen is a touchscreen, and configuring the display screen to display the user setting comprises responding to a single finger swipe on the touchscreen during lock screen state or during home screen state, by directly displaying a plurality of commonly used controls which includes the target sound user setting and one or more of: a wireless local area network switch, screen brightness, volume, calculator, portrait orientation lock switch, flashlight, and camera.

19. The computer readable medium of anyone of statements 13-18 wherein the processor is configured to if target sound playback is not enabled, then automatically prompt, via the control device or via a headphone in which the speaker is integrated, when media playback starts, to seta target sound level.

20. The computer readable medium of any one of statements 13-19 as integrated into the control device along with the processor.

21. The computer readable medium of statement 20 wherein the control device is a smartphone, a smartwatch, a laptop computer, a tablet computer or a desktop computer.

The following statements may also be made concerning the various aspects disclosed above.

Dynamic Target Audio

1. A method for dynamic playback of target sound, the method comprising: generating a target sound sequence in accordance with a user setting; driving a speaker with the target sound sequence; and adjusting a gain of the target sound sequence based on one or more of the following: detecting an ambient environment sound level; detecting a user context as being one of critical listening, running or jogging, or transportation as in a car or bus; detecting an environment of a user as in office, home, or public transport; detecting a user volume setting; and detecting that media playback has started or stopped.

1a. The method of statement 1 wherein the target sound sequence enables a listener to avoid distractions from internal sound sources or external sound sources that the listener hears simultaneously with playback of the target sound sequence.

1b. The method of statement 1 wherein the target sound sequence masks or lessens perceived loudness other sounds that a listener is hearing.

1c. The method of statement 1 wherein the target sound sequence enables a listener to focus on a particular activity in which the listener is engaged.

2. The method of statement 1 wherein adjusting the gain of the target sound sequence is based on detecting the user volume setting, wherein the gain is increased in response to the user volume setting being raised, and decreased when the user volume setting is lowered.

3. The method of any one of statements 1-2 further comprising driving the speaker with other audio content combined with the target sound sequence.

4. The method of statement 3 wherein the other audio content is from media playback, wherein adjusting the gain of the target sound sequence is based on detecting that the media playback has started, wherein the gain is decreased in response to media playback starting and increased when the media playback stops.

5. The method of statement 4 wherein the media playback is from one of: a game app, a music app, a movie app, a podcast app, or a web browser.

6. The method of anyone of statements 4-5 wherein the gain is decreased but not muted.

7. The method of statement 3 wherein the other audio content is from a phone call, wherein adjusting the gain of the target sound sequence is based on detecting that the phone call has started, wherein the gain is decreased or the target sound sequence is muted in response to the phone call starting, and increased or un-muted when the phone call ends.

8. The method of statement 3 wherein adjusting the gain of the target sound sequence reduces variation in short term loudness measurements of output by the speaker despite changes in the other audio content.

9. The method of statement 8 wherein short term loudness measurements are measurements over the past three seconds.

10. A method for playback of target sound, the method comprising: generating a target sound sequence in accordance with a user setting; driving a speaker with the target sound sequence; and when detecting a request for playback from a first app type or from a second app type, continuing to drive the speaker with the target sound sequence combined with playback from the first app type or from the second app type, when combined with playback from the first app, automatically ducking the target sound sequence, and when combined with playback from the second app, either i) not ducking the target gain sequence, or ii) ducking the target gain sequence less than when ducking during playback from the first app type.

11. The method of statement 10 wherein the first app type includes game, music, or movie.

12. The method of statement 10 wherein the second app type includes podcast app or web browser.

13. A method for dynamic playback of target sound, the method comprising: generating a target sound sequence in accordance with a user setting; driving a speaker with the target sound sequence; and making automatic adjustments to the target sound sequence as a function of the time day or as a function of ambient environment light levels.

14. The method of statement 13 wherein making automatic adjustments comprises adjusting the target sound sequence to produce brighter sound in the morning or during daylight, than in the evening or at night time.

15. A non-transitory computer readable medium comprising instructions that configure a processor to perform the method in any of the statements 1-14.

16. The computer readable medium of statement 15 as integrated into a smartphone, a smartwatch, a laptop computer, a tablet computer or a desktop computer.

17. The computer readable medium of anyone of statements 13-16 wherein the speaker is integrated in a housing of a headphone.

18. The computer readable medium of any one of statements 17 as integrated into the housing of the headphone.

While certain aspects have been described above and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. For example, although the description above refers to a method whose operations may be performed by the processor 7 which may be integrated within the control device 2 together with the memory 6, some if not all of those method operations could alternatively be performed by a processor that is integrated within the headphone 3 (assuming the headphone has sufficient digital computing and communication resources to do so.) The description is thus to be regarded as illustrative instead of limiting.

What is claimed is:

1. A method for playback of target sound, the method comprising the following operations performed by a programmed processor:
    a) accessing at least part of a sound file as a plurality of bins, each bin storing a plurality of audio sections, wherein the plurality of audio sections is recorded nature sounds being rainfall sounds, and all of the sections in a first one of the bins have rainfall intensities that are lower than the rainfall intensities of all the sections in a second one of the bins;
    b) executing an algorithm for forming a target sound sequence being a progression from light rainfall to heavy rainfall, wherein the algorithm selects selecting a plurality of selected audio sections from the plurality of bins and mixes the selected audio sections while cross fading to form the target sound sequence, the algorithm further makes gain adjustments on the target sound sequence as a function of simultaneously occurring reproduction of environment sound or an acoustic noise cancellation (ANC) process, and when making the gain adjustments as a function of the ANC process the target sound sequence is tailored and added to mask any remaining or residual audible effects of the ANC process; and
    c) driving a speaker with the target sound sequence.

2. The method of claim 1 wherein the selected audio sections are selected randomly from each bin.

3. The method of claim 2 wherein for any given bin all of the sections in the given bin sound different but have similar rainfall intensity.

4. The method of claim 1 wherein selecting audio sections from the bins is in accordance with a predefined bin sequence from which the audio selections are made, the predefined bin sequence repeats in order to continuously form the target sound sequence, and when each section in a bin has been randomly selected at least once the sections of the bin are shuffled before being re-used in the predefined bin sequence.

5. The method of claim 1 further comprising
    stereo widening the target sound sequence into a left headphone driver signal and a right headphone driver signal.

6. The method of claim 1 further comprising downloading the plurality of bins from a cloud server into a headphone in which the speaker is integrated, or into a control device that is communicatively coupled to the headphone.

7. A non-transitory computer readable medium comprising instructions that configure a processor to:
    access at least part of a sound file as a plurality of bins, each bin storing a plurality of audio sections, wherein the plurality of audio sections is recorded nature sounds being rainfall sounds; and
    execute an algorithm that forms a target sequence by selecting audio sections from the plurality of bins and mixing the selected audio sections while cross fading to form the target sound sequence being a progression from light rainfall to heavy rainfall, wherein the target sound sequence is to then drive a speaker, the algorithm further makes gain adjustments on the target sound sequence as a function of simultaneously occurring reproduction of environment sound or an acoustic noise cancellation (ANC) process, and when making the gain adjustments as a function of the ANC process the target sound sequence is tailored and added to mask any remaining or residual audible effects of the ANC process.

8. The computer readable medium of claim 7 wherein the selected audio sections are selected randomly from each bin.

9. The computer readable medium of claim 8 wherein for any given bin all of the sections in the given bin sound different but have similar rainfall intensity.

10. The computer readable medium of claim 8 wherein all of the sections in a first one of the bins have rainfall intensities that are lower than the rainfall intensities of all the sections in a second one of the bins.

11. The computer readable medium of claim 7 wherein selecting audio sections from the bins is in accordance with a predefined bin sequence from which the audio selections are made, the predefined bin sequence repeats in order to continuously form the target sound sequence, and when each section in a bin has been randomly selected at least once the sections of the bin are shuffled before being re-used in the predefined bin sequence.

12. The computer readable medium of claim 7 wherein the processor is further configured to stereo widen the target sound sequence into a left headphone driver signal and a right headphone driver signal.

13. The computer readable medium of claim 7 wherein the processor is further configured to download the plurality of bins of the sound file from a cloud server into a headphone in which the speaker is integrated, or into a control device that is communicatively coupled to the headphone.

14. The computer readable medium of claim 13 as integrated into the control device along with the processor.

15. The computer readable medium of claim 14 wherein the control device is a smartphone, a smartwatch, a laptop computer, a tablet computer or a desktop computer.

16. The computer readable medium of claim 13 as integrated into a housing of the headphone along with the processor.

17. An audio device comprising:
a processor; and
memory having stored therein instructions that configure the processor to
access at least part of a sound file as a plurality of bins, each bin storing a plurality of audio sections, wherein the plurality of audio sections is recorded nature sounds being rainfall sounds; and
execute an algorithm that forms a target sequence by selecting audio sections from the plurality of bins and mixing the selected audio sections while cross fading to form the target sound sequence as a progression from light rainfall and then over time to a heavy downpour, and wherein the target sound sequence is to then drive a speaker, the algorithm further makes gain adjustments on the target sound sequence as a function of simultaneously occurring reproduction of environment sound or an acoustic noise cancellation (ANC) process, and when making the gain adjustments as a function of the ANC process the target sound sequence is tailored and added to mask any remaining or residual audible effects of the ANC process.

18. The audio device of claim 17 wherein the processor is further configured to stereo widen the target sound sequence into a left headphone driver signal and a right headphone driver signal.

19. The audio device of claim 17 wherein the sound file is stored in the memory.

20. The audio device of claim 17 wherein the processor and the memory are integrated in a smartphone, a smartwatch, a laptop computer, a tablet computer or a desktop computer.

* * * * *